United States Patent
Keefer et al.

(10) Patent No.: US 6,692,626 B2
(45) Date of Patent: Feb. 17, 2004

(54) ADSORBENT LAMINATE STRUCTURES

(75) Inventors: Bowie G. Keefer, Vancouver (CA); Alain Carel, Vancouver (CA); Brian Sellars, Coquitlam (CA); Ian Shaw, Richmond (CA); Belinda Larisch, Vancouver (CA)

(73) Assignee: QuestAir Technologies Inc. (CA)

( * ) Notice: Subject to any disclaimer, the term of this patent is extended or adjusted under 35 U.S.C. 154(b) by 27 days.

(21) Appl. No.: 09/839,381

(22) Filed: Apr. 20, 2001

(65) Prior Publication Data

US 2002/0022146 A1 Feb. 21, 2002

(51) Int. Cl.[7] ............................................... C25D 13/02
(52) U.S. Cl. ..................... 204/491; 204/490; 204/512; 204/486
(58) Field of Search ................. 204/490, 491, 204/512, 486

(56) References Cited

U.S. PATENT DOCUMENTS

| | | | |
|---|---|---|---|
| 3,622,473 A | * | 11/1971 | Ohta et al. .................. 204/488 |
| 4,354,859 A | | 10/1982 | Keller et al. |
| 4,452,612 A | | 6/1984 | Mattia |
| 4,530,705 A | | 7/1985 | Firey |
| 4,702,903 A | | 10/1987 | Keefer |
| 4,758,253 A | | 7/1988 | Davidson et al. |
| 4,781,735 A | | 11/1988 | Tagawa |
| 4,801,308 A | | 1/1989 | Keefer |
| 4,816,121 A | | 3/1989 | Keefer |
| 4,968,329 A | | 11/1990 | Keefer |
| 4,969,935 A | | 11/1990 | Hay |
| 5,082,473 A | * | 1/1992 | Keefer ............................ 55/25 |
| 5,133,784 A | | 7/1992 | Boudet et al. |
| 5,246,676 A | | 9/1993 | Hay |
| 5,248,325 A | | 9/1993 | Kagimoto et al. |
| 5,256,172 A | | 10/1993 | Keefer |

(List continued on next page.)

FOREIGN PATENT DOCUMENTS

| | | |
|---|---|---|
| CA | 1256038 | 6/1989 |
| CA | 2016045 | 8/1994 |
| CA | 2109055 | 2/1999 |
| CA | 2087972 | 1/2000 |
| CA | 2087973 | 1/2001 |
| EP | 0 143 537 | 3/1990 |
| EP | 0 681 860 A2 | 7/1996 |
| EP | 1 070 531 A2 | 1/2001 |
| WO | WO 94/04249 | 8/1992 |

OTHER PUBLICATIONS

Vaporciyan and Kadiec, "Periodic Separating Reactors: Experiments and Theory," *AIChE Journal* 35, pp. 831–844 (1989).

Chatsiriwech et al., "Enhancement of Catalytic Reaction by Pressure Swing Adsorption," *Catalysis Today* 20, Elsevier Science, pp. 351–366 (1994).

Hufton et al., "Sorption Enhanced Reaction Process for Hydrogen Production," *AIChE Journal*, vol. 45 No. 2, 248–256 (Feb. 1999).

Primary Examiner—Kishor Mayekar
(74) Attorney, Agent, or Firm—Klarquist Sparkman, LLP (57) ABSTRACT

Methods for forming adsorbent laminate structures particularly for use in pressure swing adsorption processes and devices are disclosed. One disclosed embodiment comprises providing a metal or alloy support and depositing adsorbent material onto the support by electrophoretic deposition. Adsorbent material also may be deposited on plural strips, which are then assembled into a laminate structure along the support. Adsorbers also are described comprising first and second wire mesh sheets having adsorbent material deposited on a first major planar surface thereof. The first and second sheets are placed adjacent one another and spaced sufficiently to define a flow channel. Another disclosed embodiment comprises plural wire mesh sheets having adsorbent material deposited on both first and second major opposed planar surfaces thereof, the sheets being spaced from each other to define a gas flow channel. The adsorber may include ventilation gaps to provide ventilation between flow channels.

12 Claims, 6 Drawing Sheets

U.S. PATENT DOCUMENTS

| | | |
|---|---|---|
| 5,328,503 A | 7/1994 | Kumar |
| 5,393,326 A | 2/1995 | Engler |
| 5,411,578 A | 5/1995 | Watson |
| 5,441,559 A | 8/1995 | Petit et al. |
| 5,487,775 A | 1/1996 | LaCava et al. |
| 5,523,326 A | 6/1996 | Dandekar et al. |
| 5,656,067 A | 8/1997 | Watson et al. |
| 5,658,370 A | 8/1997 | Vigor et al. |
| 5,711,926 A | 1/1998 | Knaebel |
| 5,827,577 A * | 10/1998 | Spencer ...................... 427/475 |
| 5,917,136 A | 6/1999 | Gaffney et al. |
| 6,051,050 A | 4/2000 | Keefer et al. |
| 6,056,804 A | 5/2000 | Keefer et al. |
| 6,063,161 A | 5/2000 | Keefer et al. |
| 6,143,057 A | 11/2000 | Bülow et al. |
| 6,176,897 B1 | 1/2001 | Keefer |
| 6,217,732 B1 * | 4/2001 | Schuh et al. ................ 204/490 |

* cited by examiner

ADSORBENT LAMINATE STRUCTURES

CROSS REFERENCE TO RELATED APPLICATION

The present application claims priority from copending Canadian application No. 2,306,311, which is incorporated herein by reference.

FIELD

The present application concerns parallel passage adsorbent and catalyst structures, particularly for high frequency pressure swing adsorption processes for separation of gas components or gas phase chemical reactions.

BACKGROUND

As outlined in co-pending U.S. patent application Serial No. 60/100,091 and U.S. Pat. No. 5,082,473, which are incorporated herein by reference, gas separation by pressure swing adsorption (PSA) is advantageously conducted at high cycle frequencies using laminated parallel passage adsorbers. These "adsorbent laminate" adsorbers provide high surface area and low pressure drop, which enable high frequency operation. The adsorbent is supported in thin sheets separated by spacers which establish the gap height between adjacent sheets and thus define flow channels between each pair of adjacent sheets.

SUMMARY

One embodiment of a disclosed method for forming an adsorbent sheet for use in a pressure swing adsorption process comprises providing a metal support and depositing adsorbent material onto the support by electrophoretic deposition. The adsorbent material may be a variety of materials including, without limitation, a zeolite or a desiccant. Typical zeolites include hydrophilic zeolites and hydrophobic zeolites, such as A-type zeolites, X-type zeolites, Y-type zeolites, chabazite and silicalite. The support material typically is aluminum, steel, stainless steel, or alloys thereof.

The method also can include pretreating a surface of the metal to facilitate bonding of the adsorbent material to the support. For example, pretreating may comprise oxidizing the surface prior to depositing the adsorbent material. If the metal support is an aluminum support, the support may be anodized to form an alumina layer.

The adsorbent material is deposited on the support to form an adsorbent coating having a thickness of from about 5 to about 100 microns, and more typically from about 25 to about 60 microns. Adsorbent material has been deposited on a first planar surface, and on both first and second planar surfaces of the support material.

Electrophoretic deposition generally involves forming an electrophoretic deposition bath comprising an adsorbent material, and thereafter moving a support through the bath to deposit adsorbent on the support to form a coated support. The coated support may be fired to activate the adsorbent.

Adsorbent material may be deposited on plural strips, which are then assembled into an adsorbent laminate structure. In these embodiments, the first adsorbent material may be the same as or different from the second adsorbent material. For example, the adsorbent material may be a zeolite, or a combination of materials may be used, such as a using both a desiccant and a zeolite.

Laminates for use primarily in pressure swing adsorption processes also are described. One example of a disclosed laminate comprises an elongate support, such as a wire mesh support, which supports a first strip having a first adsorbent material applied thereto, and a second strip having a second adsorbent material applied thereto, where the first adsorbent is the same as or different from the second adsorbent. Typically, plural strips are positioned adjacent one another along the support. The strips may be spaced along the support to define a ventilation gap.

Flow channels allow gas flow about the laminates. For disclosed embodiments, the flow channels are from about 10 centimeters to about 20 centimeters long, and have a channel gap height of from about 50 to about 75 microns. The adsorbent material applied to the strips typically has an adsorbent layer thickness of from about 25 to about 60 microns. The laminates also typically have an adsorber voidage ratio of from about 0.25 to about 0.6, and for higher cycle frequencies an adsorber voidage ratio of from about 0.4 to about 0.5. The dimensions and voidage ratios can differ from those stated for working embodiments and still be within the scope of the present invention.

Adsorbers also are described comprising first and second wire mesh sheets having adsorbent material deposited on a first major planar surface of the sheets. The first and second sheets are placed adjacent one another and spaced sufficiently to define a flow channel. Another embodiment of disclosed adsorbers comprises two or more wire mesh sheets with adsorbent material deposited on both first and second major opposed planar surfaces thereof. The sheets are spaced from each other, such as by using a spacer, to define a gas flow channel. For example, the spacer may comprise a photolithographically etched metal foil, a wire mesh, or one or more sheets may comprise spacers embossed on a surface thereof. The adsorber also may include ventilation gaps to provide ventilation between flow channels.

DETAILED DESCRIPTION

Laminate sheets of the present invention have a structural backing material to which the active adsorbent material is attached. Using X type zeolites as the active adsorbent, adsorbent laminates have been fabricated with various sheet supports including woven wire mesh, metal foils, nonwoven fiber glass scrims, and woven glass fiber cloth. These adsorbent laminates have been successfully operated for oxygen enrichment at PSA cycle frequencies of up to 200 cycles per minute.

An adsorber comprising adsorbent laminates must have a flow channel length sufficient to confine the mass transfer zone and to avoid excessive mixing by axial diffusion. The channels between adjacent sheets must be high enough so that pressure drop along the channels is a small fraction of the working pressure changes of the PSA cycle. The spacers in the channels are preferably configured so as to minimize pressure drop in the channels.

The adsorbent after application to the adsorbent layers is typically macroporous, with a fine structure of micropores in the adsorbent material within which the adsorptive separation takes place, with a coarser structure of macropores which provides enhanced diffusive and convective access from the flow channel to the micropores. The thickness of the adsorbent layers on one or both sides of the channels must be sufficient for effective function of the PSA process.

The adsorber voidage ratio is defined to be the ratio between the volume of the flow channels and the sum of the volume of the flow channels plus the volume of the macroporous adsorbent contacting the flow channels. The adsorber voidage ratio typically will be in the range of 0.25 to 0.6, and more preferably 0.4 to 0.5. Higher adsorber voidage ratio values will reduce pressure drop, and are thus favored for operation at the highest cycle frequencies where pressure drop more seriously degrades performance.

Typical dimensions of adsorbent laminates in working embodiments have a flow channel length of 10 cm to 20 cm, a channel gap height of 50 to 75 microns, and an adsorbent coating thickness of 50 to 75 microns on both sides of the sheets, operating at PSA cycle frequencies up to 150 cycles/minute. The adsorbent coating for disclosed embodiments was from about 5 to about 100 microns thick, more preferably from about 25 to about 60 microns thick, with thinner coatings used for cycle frequencies to 300 cycles/minute or more.

High performance adsorbent laminates must be manufactured with high precision so that the channels and adsorbent layers are uniform in order to maintain narrow concentration fronts, so that high product productivity and recovery can be achieved at high purity. Hence, both the thickness of the applied adsorbent layer on the support, and the height of the spacers defining the channels, must be established with high accuracy and consistency. The present invention provides adsorbent laminate configurations achieving the necessary accuracy.

Electrophoretic Coating

A metallic support for the laminate provides desirable thermal properties of high heat capacity and conductivity which "isothermalize" the PSA cycle to reduce temperature variations that degrade the process when conducted under more adiabatic conditions. Metal foils are manufactured with highly accurate thickness dimensional control. Hence there is a need for a method to coat metal foils with a thin adsorbent layer of accurately controlled thickness and with good adhesion of the adsorbent to the support.

Electrophoretic deposition (EPD) can be used to apply high quality coatings of uniform thickness to metal substrates. The method can be used to apply organic paints and inorganic particulate coatings on electrically conductive substrates. Examples of patented methods for electrophoretic deposition of industrial materials include Emiliani et al. (U.S. Pat. No. 5,415,748) for deposition of metallic oxide coatings; Friedman et al. (U.S. Pat. Nos. 5,591,691, 5,604,174 and 5,795,456) for deposition of alumina catalyst support on stainless steel foils for automotive catalytic converters; and Appleby (U.S. Pat. No. 4,555,453) for deposition of molten carbonate fuel cell electrolyte and binder. These patents are incorporated herein by reference.

In the present invention, EPD is used to form macroporous adsorbent coatings of zeolite, alumina or other adsorbents on one or both sides of a metal support, such as a metal foil, an expanded metal foil, a metal screen or other conductive substrate. The metal foil may be (for example) composed of aluminum, steel, nickel, stainless steel or alloys thereof. For adhesion of the electrophoretic adsorbent coating on the foil, the metal foil surface may be oxidized and preferably roughened for favorable wetting and bonding properties. An oxide coating may be applied by heating in a furnace with air or oxygen, as disclosed by Dunne (U.S. Pat. No. 5,260,243) for slip-coating zeolite slurries onto aluminum tubes. As disclosed by Chapman et al. in U.S. Pat. Nos. 4,279,782 and 4,331,631, the foil may be formed by metal peeling of an aluminum-containing ferritic stainless steel and processed so that alumina whiskers will substantially cover the oxide film.

In the present invention, the metal surface may require pretreatment to increase deposit adhesion. A preferred approach for preparing the oxide surface of an aluminum foil is by anodization under acidic conditions so as to form an alumina layer approximately 1 to 2 microns thick, with a dense hexagonal columnar array of pores regularly spaced approximately 0.2 to 1.5 microns apart. As discussed by Furneaux et al. (U.S. Pat. No. 4,687,551), pore spacing is proportional to applied voltage, and would be about 0.5 micron with an anodization voltage of 200 V. The anodic pore structure would provide excellent adhesion, and in preferred embodiments can usefully act as a template for forming a desirable regular columnar orientation of macropores on the hexagonal pattern of the anodic film pores. During the electrophoretic coating process, the hexagonal template pattern perturbs the electrostatic field in the coating being formed to create preferred distribution of porosity with the desired columnar array.

Other methods of microtexturing the base surface also can be used. For example, a photolithographic mask can be used to establish a regular pattern to similarly distort the electrostatic field in the coating under deposition. Any such technique likewise may be used to provide a template pattern for achieving deposition of the adsorbent coating with oriented macropores in that pattern and normal to the final laminate surface; and thus approaching the ideal of a non-tortuous macropore network as highly desirable for excellent mass transfer under high frequency operating conditions.

The adsorbent material to be coated may be any suitable hydrophilic zeolite (e.g. suitably ion exchanged X, A or chabazite type zeolites as used for air separation and hydrogen purification) or hydrophobic zeolite (e.g. Y or silicalite as used for separating organic vapors from humid air). The adsorbent may be an alumina gel or an active carbon. The adsorbent may be catalytically active, or may include an admixture of a catalyst. The adsorbent material to be coated may in fact be a precursor material (e.g. metakaolin) that will be converted to a useful adsorbent (zeolite) in-situ after deposition on the laminate sheet.

An inorganic or organic binder additive component may be used to bind the adsorbent particles within the coating. Inorganic binders may be inert; however certain inorganic binders used with zeolite adsorbents may be converted in situ to zeolite so that the zeolite is self-bound with minimal inert material. Organic binder used with activated carbon may be pyrolyzed to form a useful carbonaceous adsorbent.

The adsorbent material is provided or prepared as finely divided particles, preferably with a narrow size distribution. The particles are preferably less than 4 micron in size, preferably less than 1 micron in size, to aid in the suspension of the particles in the EPD slurry. The particles are placed in an aqueous or nonaqueous suspension for EPD, together with any appropriate organic or inorganic binders, dispersants, surfactants, defoaming agents, polyelectrolytes, etc. EPD may be conducted with the metal foil as an electrode contacting the suspension in a bath having a counterelectrode. The foil may be the cathode or anode, according to the charge of the suspended adsorbent particles respectively either positive or negative. In an aqueous EPD process, an acidic pH typically would be used for cathodic deposition, and an alkaline pH for anodic deposition.

A non-aqueous suspension also may be used. Suitable materials include lower (i.e., 10 or fewer carbon atoms, including both straight and branched chain compounds) alkyl alcohols, such as isopropanol. As discussed by Appleby (U.S. Pat. No. 4,555,453), positive charge may be attached to the adsorbent particle materials by adsorption of a carboxylic acid thereon, or negative charge may be attached by adsorption of an amine salt.

Long chain polymers in fibers of e.g. 0.1 to 5 micron diameter and 1 to 150 micron length may be charged positively at one end or negatively at the other end, and added to the suspension so as to orient in the field direction normal to the laminate sheet being coated. These fibers entering the coating preferentially orient more or less perpendicular to the substrate. The fibers may be located randomly in the coating, but also may be guided by electrostatic field gradients established by a template as discussed above so as to locate the fibers approximately in a regular (e.g. hexagonal) pattern. Upon subsequent firing of the adsorbent coating, these fibers are removed by volatilization, pyrolysis or combustion to define well opened and straight macropores as desired. If the fibers were located in a regular array within the coating by a template, they will define a columnar array of macropores desirably with approximately equal spacing.

The laminate sheet may be formed upon a metal substrate whose width is equal to the length of the laminate adsorber in the flow direction within the PSA process. The substrate width could also be an integral multiple of the adsorber length, before subsequent slitting of the substrate to size. It is highly desirable that the sheet coating be applied in the direction orthogonal to the future flow direction after installation, so that any transverse coating irregularities will be distributed equally in the flow channels. After a roll of the metal foil has been coated by passing continuously through the EPD bath, then dried and fired (if required) to calcine the binder and/or activate the adsorbent, the roll may be cut into sheets of the appropriate size to be assembled in the laminate adsorber.

Alternatively, the laminate adsorber may be assembled from a plurality of strips to be installed orthogonal to the flow direction, and whose width is a fraction of the installed flow direction length of the laminate adsorber. Each sheet layer then consists of a plurality of separate strips. The flow channels through the adsorber will thus traverse a plurality of these strips in passing from the feed end to the product end of the adsorber. The strips advantageously may be prepared of different adsorbent materials when the PSA process requires a layered adsorber with different adsorbents in different zones along the length of the flow channels. Thus, the adsorbent in the first strip at the feed end may be alumina or other desiccant, so that adsorbent strips toward the product end may use more selective adsorbents whose function may be impaired by excessive humidity. The strips may be based on metal foil ribbons individually coated by EPD in separate baths for each adsorbent material.

The EPD coated foil may be coated on one or both sides. If coated only on one side, an adsorbent laminate sheet optionally may be comprised of two singly coated sheets installed back-to-back.

Spacers for Adsorbent Laminate Structures

Spacers may be formed by embossing a raised pattern of bosses or ridges (parallel to the flow channels), so that the EPD coating over those bosses or ridges establishes the spacers. The laminate assembly must then be configured to avoid nesting of male and female indentations, for example by forming each sheet from two foils of which only one is embossed while the other remains flat. Alternatively, a raised pattern of metallic layers may be formed by electroforming or etching the metal foil.

Spacer may alternatively be provided in the EPD process by masking during part of the deposition process so as to create a raised pattern.

In alternative preferred embodiments as described below, spacers are provided as a separate fabricated assembly to be installed between flat EPD coated sheets or ribbons.

Figure 1:
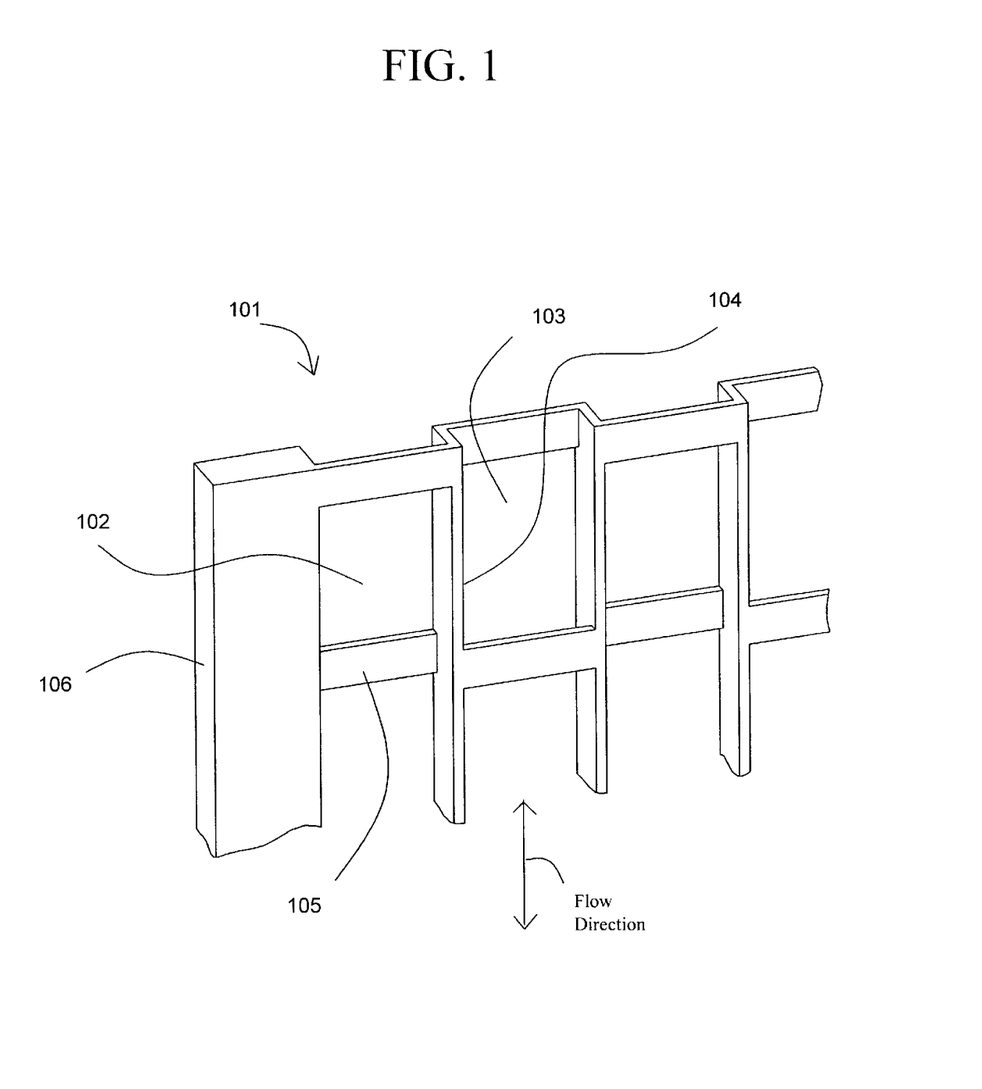
FIG. 1 is a schematic view of a spacer formed by etching a metal foil with a photolithographic mask.

FIG. 1 shows a spacer 101 formed by etching a metal foil with a photolithographic mask on both sides. Channels 102, 103 are created by through etching simultaneously from both sides to create open areas, while full thickness spacer ribs 104 between the channels are defined by the mask on both sides. Lateral struts 105 are formed at intervals by etching the struts only from one side while masked on the other side. The edge 106 of the spacer is defined by masking from both sides, with a suitable width for installation e.g. by bonding in the laminate stack of alternating sheets and spacers.

Figure 2:
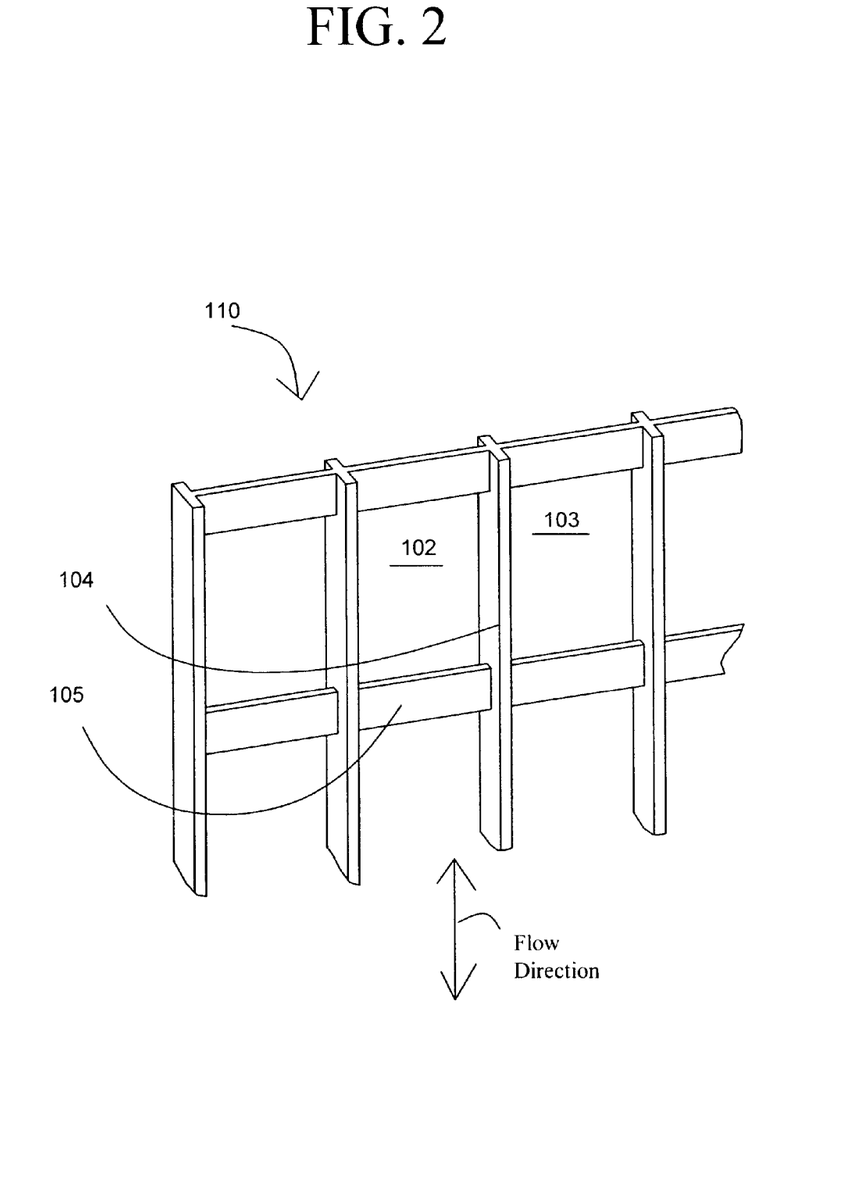
FIG. 2 is a schematic view of another embodiment of a spacer.

FIG. 2 shows a spacer 110, which may be fabricated in several ways, e.g. (1) from metal foil by etching followed by rolling to reduce the thickness of the struts 105, (2) by diffusion bonding of thin foil strips laid across each other, or (3) by a thermoplastic molding.

FIGS. 3–6 show a adsorbent laminate structure 300. Typical sheets 301 and 302 comprise adsorbent strips e.g. 304 and 305 made by EPD coatings 306 and 307 on both sides of substrate ribbons e.g. 308. The ribbons have a width "w" in the flow direction indicated by arrow 310.

Figure 3:
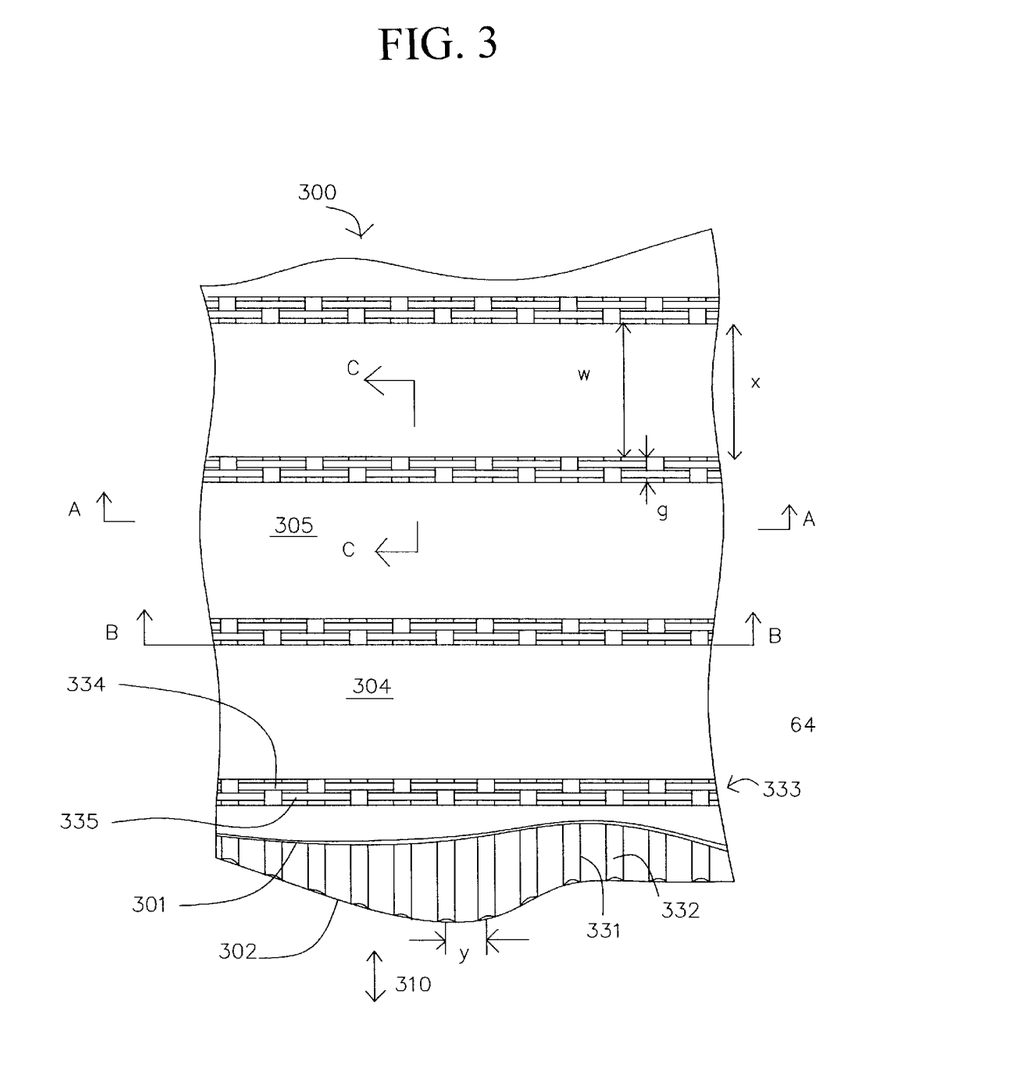
FIG. 3 is a schematic view of a portion of an adsorbent laminate layer in the plane of gas flow channels.
Figure 4:
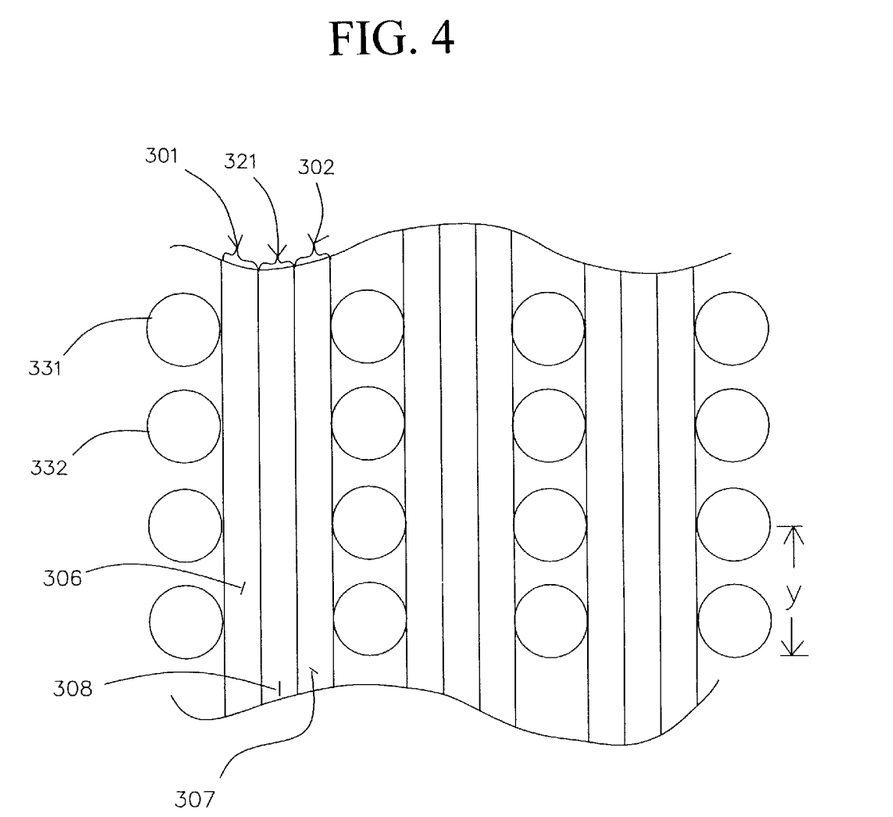
FIG. 4 shows section A—A of the adsorbent laminate of FIG. 3.
Figure 5:
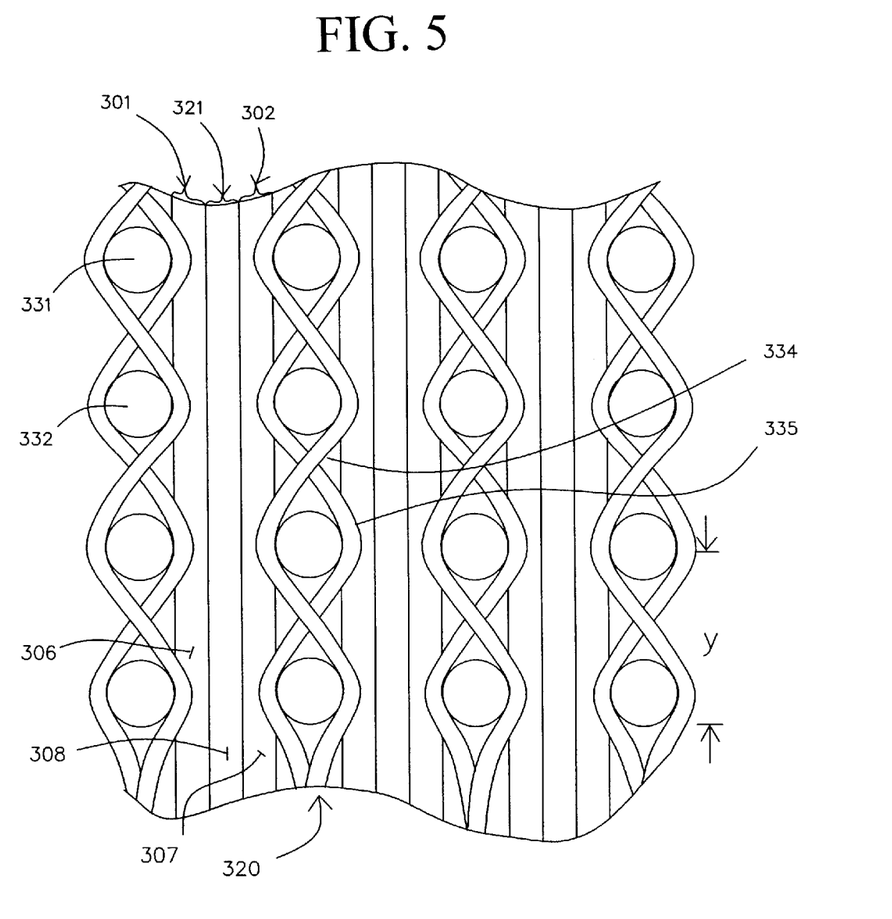
FIG. 5 shows a section B—B of the adsorbent laminate of FIG. 3.
Figure 6:
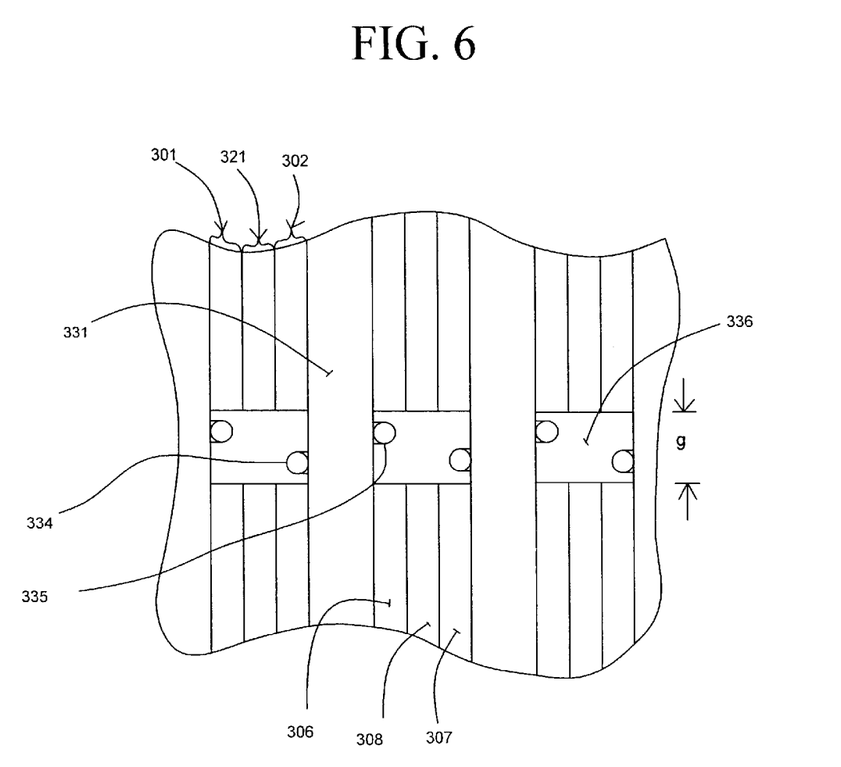
FIG. 6 shows an edge view as section C—C respectively of the adsorbent laminate of FIG. 3.

FIG. 3 shows a portion of an adsorbent laminate layer in the plane of the flow channels. FIG. 4 shows section A—A, FIG. 5 shows section B—B, and FIG. 6 shows an edge view as section C—C respectively of FIG. 3.

In FIGS. 3–6, a woven wire mesh spacer 320 is used in each flow channel 321, between adjacent pairs of sheets 301 and 302. Each sheet in the depicted embodiment comprises multiple ribbons or strips 304 and 305, although it will be understood that the spacer 320 of this invention also may be used as spacers with continuous rather than ribbon sheets. The spacer 320 comprises straight larger diameter "warp" wires e.g. 331 and 332 which are themselves the spacers, and at intervals along the warp wires separated by a distance "x" those wires are braced and laterally spaced at equal intervals of distance "y" by a pair 333 of "weft" wires 334 and 335 of preferably smaller diameter. The distance "x" is greater than the ribbon width "w" by a distance "g" which defines a gap 336 between adjacent ribbons along the flow path. The distance "g" is slightly more than twice the diameter of the weft wires 334 and 335, so as to provide a free gap for the weft wires to wrap around the warp wires e.g. 331 without interference with the adsorbent ribbons. This gap 336 between each pair of ribbons also provides ventilation between all the flow channels for pressure equalization and flow redistribution to minimize channeling in the event of any flow maldistribution or tolerance deviations.

The present invention has been described with reference to certain preferred embodiments. The scope of the invention should not be limited to these preferred embodiments.

We claim:

1. A method for forming a laminate adsorber for use in a pressure swing adsorption process, comprising:
   providing first and second metal supports having first and second major planar surfaces;
   oxidizing the metal supports;
   depositing adsorbent material onto the first and second surfaces of the supports by electrophoretic deposition to form first and second coated supports having an adsorbent layer thickness of from about 5 to about 100 microns, the adsorbent material being selected from the group consisting of zeolite X, zeolite A, chabazite, zeolite Y, silicalite and combinations thereof;
   firing the coated supports to activate the adsorbent and thereby form first and second adsorbent elements; and
   assembling the first and second elements into a laminate adsorber, the first element being spaced from the second element to form a ventilation gap.

2. The method according to claim 1 where the metal support comprises a metal selected from the group consisting of aluminum, steel, stainless steel, or alloys thereof.

3. The method according to claim 1 where the metal support is an aluminum support and the support is anodized to form an alumina layer.

4. The method according to claim 1 where depositing adsorbent material forms an adsorbent coating having a thickness of from about 25 to about 60 microns.

5. The method according to claim 1 further comprising:
   forming an electrophoretic deposition bath comprising an adsorbent material;
   moving the supports through the bath to deposit adsorbent on the supports to form the coated supports; and
   firing the coated supports to activate the adsorbent.

6. The method according to claim 1 where the first support includes a first adsorbent material that is different from a second adsorbent material deposited on the second support.

7. The method according to claim 6 where the first adsorbent material is a desiccant.

8. The method according to claim 1 where at least one of the first and second supports includes spacers to space the first and second supports one from the other.

9. The method according to claim 8 where the spacers are formed by embossing a pattern on the support.

10. The method according to claim 1 and further comprising placing a spacer between the first support and the second support.

11. The method according to claim 10 where the spacer comprises a woven wire mesh spacer.

12. The method according to claim 11 where the woven wire mesh spacer provides a ventilation gap which allows ventilation between gas flow channels in the adsorber.

* * * * *